(12) United States Patent
Bernat et al.

(10) Patent No.: US 10,374,868 B2
(45) Date of Patent: Aug. 6, 2019

(54) DISTRIBUTED COMMAND PROCESSING IN A FLASH STORAGE SYSTEM

(71) Applicant: Pure Storage, Inc., Mountain View, CA (US)

(72) Inventors: Andrew Bernat, Mountain View, CA (US); Timothy Brennan, San Francisco, CA (US); Alan Driscoll, Fremont, CA (US); Grigori Inozemtsev, San Jose, CA (US)

(73) Assignee: Pure Storage, Inc., Mountain View, CA (US)

( * ) Notice: Subject to any disclaimer, the term of this patent is extended or adjusted under 35 U.S.C. 154(b) by 251 days.

(21) Appl. No.: 14/927,280

(22) Filed: Oct. 29, 2015

(65) Prior Publication Data

US 2017/0126470 A1  May 4, 2017

(51) Int. Cl.
*G06F 15/16*  (2006.01)
*H04L 12/24*  (2006.01)
*H04L 29/08*  (2006.01)
*G06F 3/06*  (2006.01)

(52) U.S. Cl.
CPC .......... *H04L 41/042* (2013.01); *G06F 3/0604* (2013.01); *G06F 3/0629* (2013.01); *G06F 3/0689* (2013.01); *H04L 41/0853* (2013.01); *H04L 41/0893* (2013.01); *H04L 67/1097* (2013.01); *H04L 41/0869* (2013.01)

(58) Field of Classification Search
USPC ....................................................... 709/217
See application file for complete search history.

(56) References Cited

U.S. PATENT DOCUMENTS

| | | | |
|---|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |

(Continued)

FOREIGN PATENT DOCUMENTS

| | | |
|---|---|---|
| EP | 0725324 A2 | 8/1996 |
| WO | WO 2012/087648 A1 | 6/2012 |

(Continued)

OTHER PUBLICATIONS

International Search Report and Written Opinion Application No. PCT/US2016/059012 dated Jan. 19, 2017 12 pages.

(Continued)

*Primary Examiner* — Alicia Baturay (57) ABSTRACT

Distributing management responsibilities for a storage system that includes a storage array controller and a plurality of storage devices, including: identifying a plurality of elements in the storage system; for each of the plurality of elements in the storage system, creating a distributed manager, wherein each distributed manager is configured for gathering information describing the state of the associated element in the storage system, determining an action to perform against the associated element in the storage system, and executing an approved action against the associated element in the storage system; and creating a distributed management hierarchy that includes each of the distributed managers.

11 Claims, 5 Drawing Sheets

(56) References Cited

U.S. PATENT DOCUMENTS

| | | | |
|---|---|---|---|
| 6,141,680 A * | 10/2000 | Cucchiara | H04L 41/042 709/201 |
| 6,430,614 B1 * | 8/2002 | Cucchiara | H04L 41/042 709/201 |
| 6,636,982 B1 * | 10/2003 | Rowlands | G06F 11/0709 714/4.1 |
| 6,643,641 B1 | 11/2003 | Snyder | |
| 6,647,514 B1 | 11/2003 | Umberger et al. | |
| 6,789,162 B1 | 9/2004 | Talagala et al. | |
| 6,950,855 B2 * | 9/2005 | Sampathkumar | H04L 29/06 709/208 |
| 7,089,272 B1 | 8/2006 | Garthwaite et al. | |
| 7,107,389 B2 | 9/2006 | Inagaki et al. | |
| 7,146,521 B1 | 12/2006 | Nguyen | |
| 7,334,124 B2 | 2/2008 | Pham et al. | |
| 7,437,530 B1 | 10/2008 | Rajan | |
| 7,457,236 B2 * | 11/2008 | Cheng | H04L 43/0817 370/220 |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,886,121 B2 * | 2/2011 | Kito | G06F 3/0605 711/117 |
| 7,899,780 B1 | 3/2011 | Shmuylovich et al. | |
| 8,037,305 B2 * | 10/2011 | Rahman | H04L 63/162 713/168 |
| 8,042,163 B1 | 10/2011 | Karr et al. | |
| 8,086,585 B1 | 12/2011 | Brashers et al. | |
| 8,209,415 B2 * | 6/2012 | Wei | H04L 41/0896 709/224 |
| 8,271,700 B1 | 9/2012 | Annem et al. | |
| 8,271,992 B2 * | 9/2012 | Chatley | G06F 3/0613 718/105 |
| 8,315,999 B2 * | 11/2012 | Chatley | G06F 3/0613 707/705 |
| 8,332,375 B2 * | 12/2012 | Chatley | G06F 3/0613 707/705 |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,522,252 B2 * | 8/2013 | Chatley | G06F 3/0613 718/105 |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,583,616 B2 * | 11/2013 | Chatley | G06F 3/0613 707/705 |
| 8,613,066 B1 | 12/2013 | Brezinski et al. | |
| 8,620,970 B2 | 12/2013 | English et al. | |
| 8,650,374 B2 * | 2/2014 | Kito | G06F 3/0605 711/117 |
| 8,751,463 B1 | 6/2014 | Chamness | |
| 8,762,642 B2 | 6/2014 | Bates et al. | |
| 8,769,622 B2 | 7/2014 | Chang et al. | |
| 8,769,644 B1 * | 7/2014 | Eicken | H04L 67/1097 709/225 |
| 8,800,009 B1 | 8/2014 | Beda, III et al. | |
| 8,812,860 B1 | 8/2014 | Bray | |
| 8,850,114 B2 * | 9/2014 | Rosenband | G06F 3/0613 711/114 |
| 8,850,546 B1 | 9/2014 | Field et al. | |
| 8,863,226 B1 * | 10/2014 | Bailey, Jr. | G06Q 30/0601 713/170 |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,943,265 B2 * | 1/2015 | Rosenband | G06F 3/061 711/103 |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,124,569 B2 | 9/2015 | Hussain et al. | |
| 9,134,922 B2 | 9/2015 | Rajagopal et al. | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,336,233 B2 * | 5/2016 | Chatley | G06F 3/0613 |
| 9,444,822 B1 | 9/2016 | Borowiec et al. | |
| 9,507,532 B1 | 11/2016 | Colgrove et al. | |
| 9,516,028 B1 * | 12/2016 | Andruschuk | H04L 63/10 |
| 9,588,691 B2 * | 3/2017 | Seppanen | G06F 3/0605 |
| 9,705,979 B2 * | 7/2017 | Chatley | G06F 3/0613 |
| 10,073,878 B1 * | 9/2018 | Han | G06F 17/30371 |
| 2002/0013802 A1 | 1/2002 | Mori et al. | |
| 2002/0019864 A1 * | 2/2002 | Mayer | G06F 9/44505 709/223 |
| 2002/0095487 A1 * | 7/2002 | Day | H04L 29/06 709/223 |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0097132 A1 * | 5/2005 | Cochran | G06F 3/0605 |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2005/0246436 A1 * | 11/2005 | Day | H04L 29/06 709/223 |
| 2006/0015771 A1 | 1/2006 | Vana Gundy et al. | |
| 2006/0041580 A1 | 2/2006 | Ozdemir et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0133767 A1 * | 6/2008 | Birrer | H04L 65/4076 709/231 |
| 2008/0162674 A1 | 7/2008 | Dahiya | |
| 2008/0195833 A1 | 8/2008 | Park | |
| 2008/0205295 A1 * | 8/2008 | Saba | G06Q 10/10 370/254 |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198815 A1 * | 8/2009 | Saba | G06Q 10/10 709/225 |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |

(56) References Cited

U.S. PATENT DOCUMENTS

| | | |
|---|---|---|
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0232152 A1 | 9/2013 | Dhuse et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0344401 A1 | 11/2014 | Varney et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121003 A1* | 4/2015 | Rosenband ............ G06F 3/061 711/114 |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0098882 A1* | 4/2016 | Holdych ............ G06Q 20/327 700/237 |
| 2016/0337365 A1* | 11/2016 | Beiter .................... G06F 9/468 |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |

FOREIGN PATENT DOCUMENTS

| | | |
|---|---|---|
| WO | WO2013071087 A1 | 5/2013 |
| WO | WO 2014/110137 A1 | 7/2014 |
| WO | WO 2016/015008 A1 | 12/2016 |
| WO | WO 2016/190938 A1 | 12/2016 |
| WO | WO 2016/195759 A1 | 12/2016 |
| WO | WO 2016/195958 A1 | 12/2016 |
| WO | WO 2016/195961 A1 | 12/2016 |

OTHER PUBLICATIONS

The International Search Report and the Written Opinion received from the International Searching Authority (ISA/EPO) for International Application No. PCT/US2016/036693, dated Aug. 29, 2016, 10 pages.

The International Search Report and the Written Opinion received from the International Searching Authority (ISA/EP) for International Application No. PCT/US2016/038758, dated Oct. 7, 2016, 10 pages.

The International Search Report and the Written Opinion received from the International Searching Authority (ISA/EP) for International Application No. PCT/US2016/040393, dated Sep. 22, 2016, 10 pages.

The International Search Report and the Written Opinion received from the International Searching Authority (ISA/EP) for International Application No. PCT/US2016/044020, dated Sep. 30, 2016, 11 pages.

Kwok Kong, *Using PCI Express As the Primary System Interconnect in Multiroot Compute, Storage, Communications and Embedded Systems*, IDT, White Paper, <http://www.idt.com/document/whp/idt-pcie-multi-root-white-paper>, retrieved by WIPO Dec. 4, 2014, dated Aug. 28, 2008, 12 pages.

The International Search Report and the Written Opinion received from the International Searching Authority (ISA/EP) for International Application No. PCT/US2016/044874, dated Oct. 7, 2016, 11 pages.

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0-7695-4430-4, DOI: 10.1109/MASCOTS.2011.50, dated Jul. 25-27, 2011, 11 pages.

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

PCMag. "Storage Array Definition". Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia. "What is a disk array". Published Jan. 13, 2012. <http://web.archive.org/web/20120113053358/http://www.techopedia.com/definition/1009/disk-array>, 1 page.

Webopedia. "What is a disk array". Published May 26, 2011. <http://web.archive.org/web/20110526081214/http://www,webopedia.com/TERM/D/disk_array.html>, 2 pages.

Li et al., *Access Control for the Services Oriented Architecture*, Proceedings of the 2007 ACM Workshop on Secure Web Services (SWS '07), Nov. 2007, pp. 9-17, ACM New York, NY.

The International Serach Report and the Written Opinoin received from the International Searching Authority (ISA/EPO) for International Application No. PCT/US2016/015006, dated Apr. 29, 2016, 12 pages.

The International Serach Report and the Written Opinoin received from the International Searching Authority (ISA/EPO) for International Application No. PCT/US2016/015008, dated May 4, 2016, 12 pages.

C. Hota et al., *Capability-based Cryptographic Data Access Controlin Cloud Computing*, Int. J. Advanced Networking and Applications, col. 1, Issue 1, dated Aug. 2011, 10 pages.

(56) References Cited

OTHER PUBLICATIONS

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "dictzip file format", GitHub.com (online). [accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Serach Report and the Written Opinoin received from the International Searching Authority (ISA/EPO) for International Application No. PCT/US2016/016333, dated Jun. 8, 2016, 12 pages.

ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinoin received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.

Jacob Bellamy-McIntyre et al., "OpenID and the EnterpriseL a Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinoin received from the International Searching Authority (ISA/EPO) for International Application No. PCT/US2016/035492, dated Aug. 17, 2016, 10 pages.

* cited by examiner

DISTRIBUTED COMMAND PROCESSING IN A FLASH STORAGE SYSTEM

BACKGROUND OF THE INVENTION

Field of the Invention

The field of the invention is data processing, or, more specifically, methods, apparatus, and products for distributing management responsibilities for a storage system.

Description of Related Art

Enterprise storage systems can frequently include many storage devices that are communicatively coupled to multiple storage array controllers. In many systems, one of the storage array controllers may serve as a primary storage array controller at a particular point in time, while other storage array controllers serve as secondary storage array controllers. The storage array controllers may also include control mechanisms that are capable of gathering information about the storage system, as well as taking some action that may be selected in dependence upon the gathered information, such as queueing commands to be executed by entities within the storage system, broadcasting commands to be executed by entities within the storage system, and so on. In such an example, the control mechanism executing on the primary storage array controller may be responsible for gathering information about the storage system and initiating an action that can be selected in dependence upon the gathered information. Issues may arise, however, when a disruption occurs between the time that information about the storage system is gathered and an action that is selected in dependence upon the gathered information is initiated.

SUMMARY OF THE INVENTION

Methods, apparatuses, and products for distributing management responsibilities for a storage system that includes a storage array controller and a plurality of storage devices, including: identifying a plurality of elements in the storage system; for each of the plurality of elements in the storage system, creating a distributed manager, wherein each distributed manager is configured for gathering information describing the state of the associated element in the storage system, determining an action to perform against the associated element in the storage system, and executing an approved action against the associated element in the storage system; and creating a distributed management hierarchy that includes each of the distributed managers.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
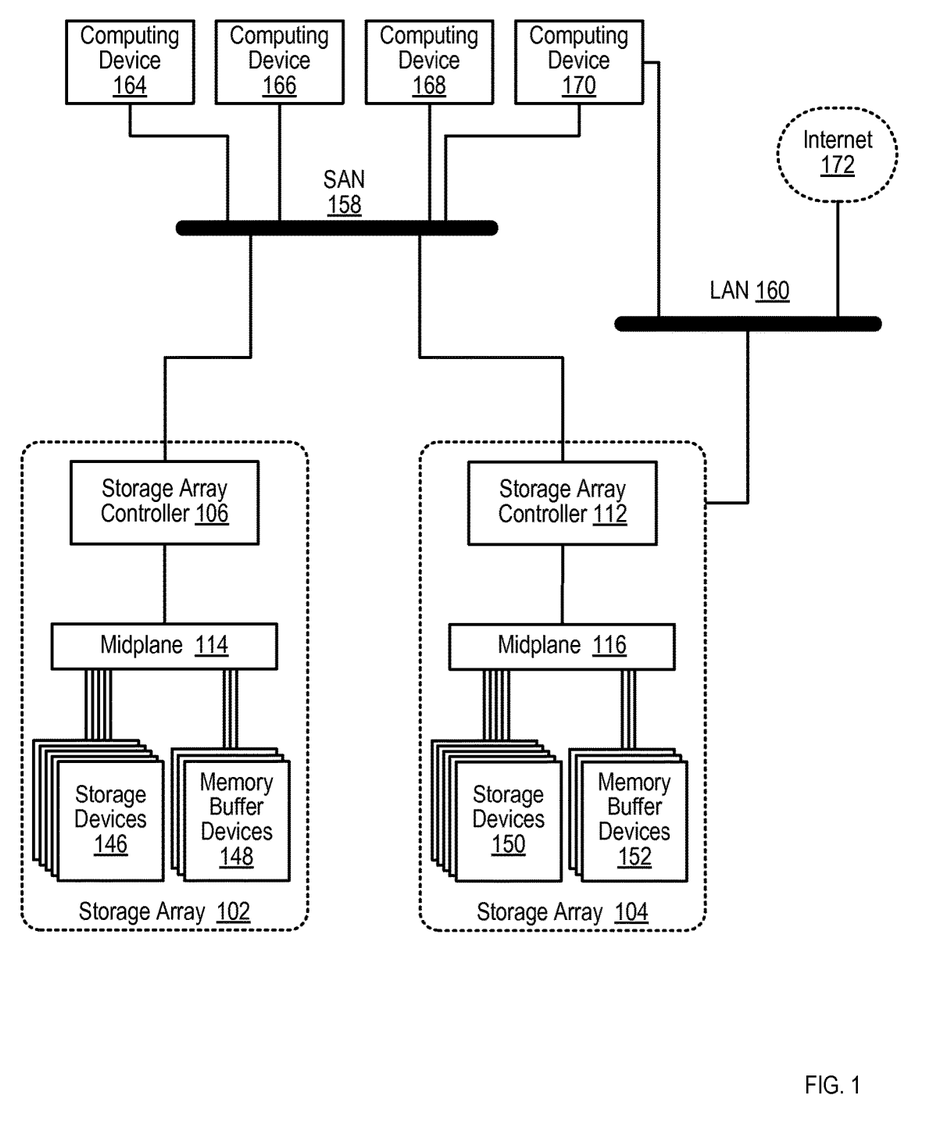
FIG. 1 sets forth a block diagram of a system in which management responsibilities are distributed according to embodiments of the present disclosure.

Example methods, apparatus, and products for distributing management responsibilities for a storage system in accordance with the present disclosure are described with reference to the accompanying drawings, beginning with FIG. 1. FIG. 1 sets forth a block diagram of a system in which management responsibilities are distributed according to embodiments of the present disclosure. The system of FIG. 1 includes a number of computing devices (164, 166, 168, 170). The computing devices (164, 166, 168, 170) depicted in FIG. 1 may be implemented in a number of different ways. For example, the computing devices (164, 166, 168, 170) depicted in FIG. 1 may be embodied as a server in a data center, a workstation, a personal computer, a notebook, or the like.

The computing devices (164, 166, 168, 170) in the example of FIG. 1 are coupled for data communications to a number of storage arrays (102, 104) through a storage area network (SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol (In, HyperText Transfer Protocol ('HTTP'), Wireless Access Protocol ('WAP'), Handheld Device Transport Protocol ('HDTP'), Session Initiation Protocol (SIP), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152). The storage array controllers (106, 112) of FIG. 1 may be configured for distributing management responsibilities for a storage system that includes a storage array controller and a plurality of storage devices, including: identifying a plurality of elements in the storage system; for each of the plurality of elements in the storage system, creating a distributed manager, wherein each distributed manager is configured for gathering information describing the state of the associated element in the storage system, determining an action to perform against the associated element in the storage system, and executing an approved action against the associated element in the storage system; and creating a distributed management hierarchy that includes each of the distributed managers, as will be described in greater detail below.

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Distributing management responsibilities for a storage system in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in distributing management responsibilities for a storage system according to embodiments of the present disclosure.

Figure 2:
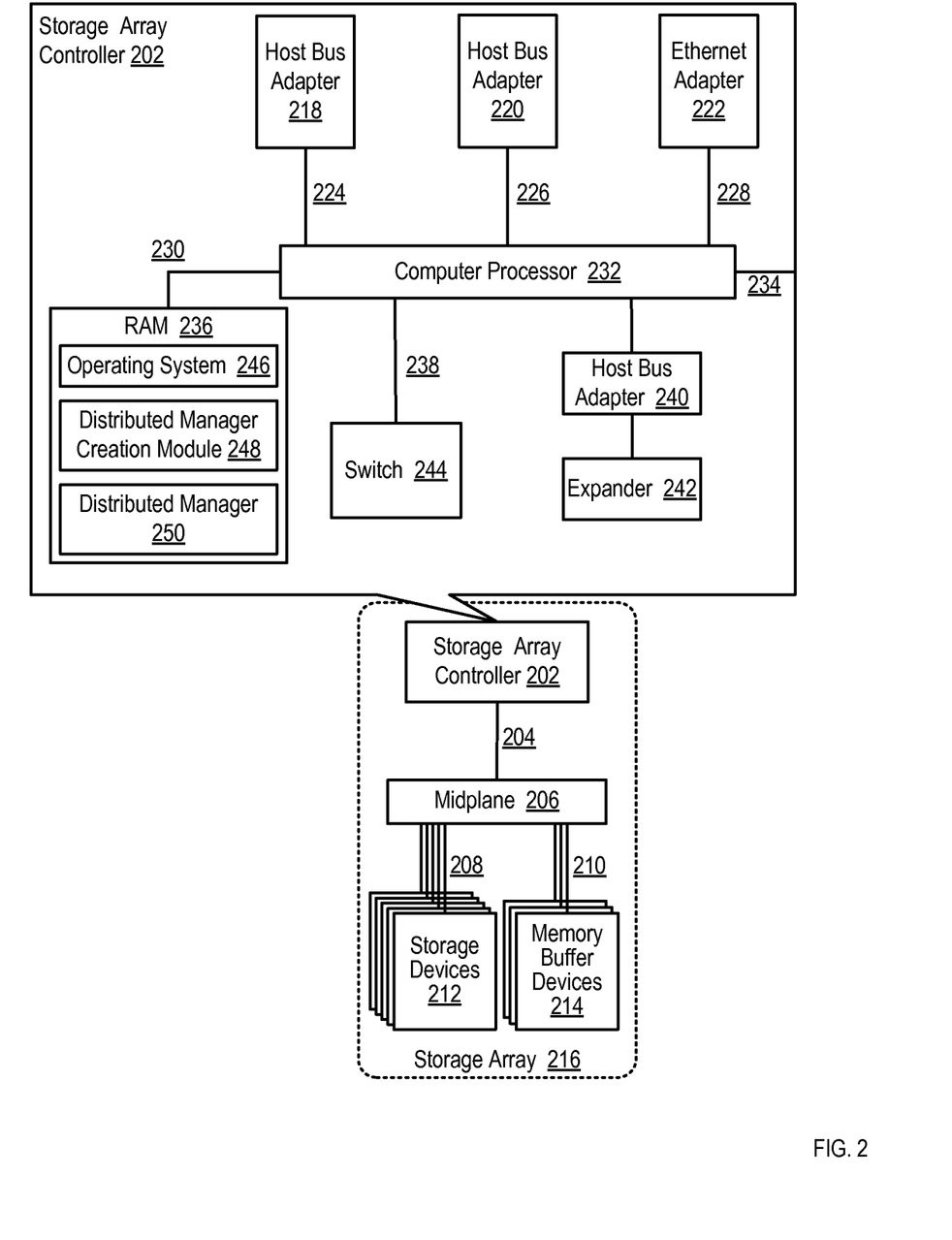
FIG. 2 sets forth a block diagram of a storage array controller useful in distributing management responsibilities for a storage system according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory (RAM') (236). The computer processor (232) may be connected to the RAM (236) via a data communications link (230), which may be embodied as a high speed memory bus such as a Double-Data Rate 4 ('DDR4') bus.

Stored in RAM (236) is an operating system (246). Examples of operating systems useful in storage array controllers (202) configured for distributing management responsibilities for a storage system according to embodiments of the present disclosure include UNIX™, Linux™, Microsoft Windows™, and others as will occur to those of skill in the art. Also stored in RAM (236) is a distributed manager creation module (248), a module that includes computer program instructions useful in distributing management responsibilities for a storage system that includes a storage array controller (202) and a plurality of storage devices (212). The manager creation module may be configured for identifying a plurality of elements in the storage system, creating a distributed manager for each of the plurality of elements in the storage system, and creating a distributed management hierarchy that includes each of the distributed managers, as will be described in greater detail below.

Also stored in RAM (236) is a distributed manager (250). Although the example depicted in FIG. 2 illustrates only a single distributed manager (250), readers will appreciate that only a single distributed manager is depicted for ease of explanation, at the other distributed managers may be created and reside throughout various locations in the storage system. Each distributed manager (250) may be configured for gathering information describing the state of the associated element in the storage system, determining an action to perform against the associated element in the storage system, and executing an approved action against the associated element in the storage system, as will be described in greater detail below. Readers will appreciate that while the distributed manager creation module (248), the distributed manager (250), and the operating system (246) in the example of FIG. 2 are shown in RAM (236), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
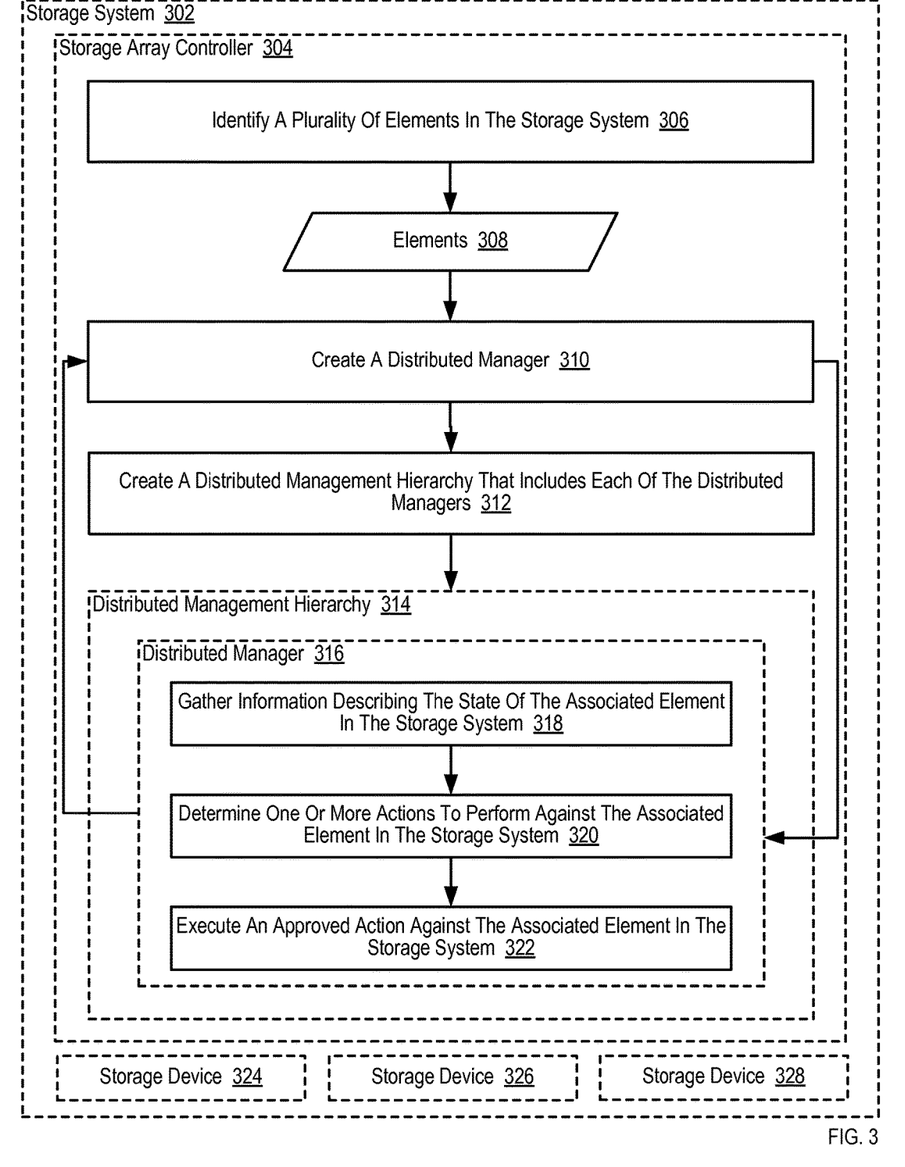
FIG. 3 sets forth a flow chart illustrating an example method for distributing management responsibilities for a storage system according to embodiments of the present disclosure.

For further explanation, FIG. 3 sets forth a flow chart illustrating an example method for distributing management responsibilities for a storage system (302) that includes a storage array controller (304) and a plurality of storage devices (324, 326, 328). The storage system (302) depicted in FIG. 3 may be similar to the storage system described above with reference to FIG. 1, and may include a plurality of storage devices (324, 326, 328) such as SSDs and NVRAM storage devices as described above. The storage system (302) depicted in FIG. 3 may also include a storage array controller (304) that is similar to the storage array controllers described above with reference to FIG. 1 and FIG. 2.

The example method depicted in FIG. 3 includes identifying (306) a plurality of elements (308) in the storage system (302). The plurality of elements (308) in the storage system (302) may be embodied, for example, as hardware devices such as the storage devices (324, 326, 328), the storage array controller (304), networking devices, and so on. In addition, the plurality of elements (308) in the storage system (302) may also be embodied as logical constructs such as, for example, a path to a particular storage device (324, 326, 328), a write group that includes a RAID redundancy set of storage devices, a collection of such write groups, and so on.

In the example method depicted in FIG. 3, identifying (306) the plurality of elements (308) in the storage system (302) may be carried out, for example, by examining inventory information that identifies each hardware device in the storage system, as well as examining system configuration information that identifies the logical constructs in the storage system (302). In such an example, the inventory information that identifies each hardware device in the storage system (302) and the system configuration information that identifies the logical constructs in the storage system (302) may be stored on one or more of the storage devices (324, 326, 328) and may be accessed by the storage array controller (304). As such, the storage array controller (304) may update such information as devices are added and removed from the storage system (302), as logical constructs are created and destroyed, and so on.

The example method depicted in FIG. 3 also includes, for each of the plurality of elements (308) in the storage system (302), creating (310) a distributed manager (316). The distributed manager (316) of FIG. 3 may be embodied, for example, as a module of computer program instructions executing on computer hardware such as a computer processor. Creating (310) a distributed manager (316) for each of the plurality of elements (308) in the storage system (302) may be carried out, for example, by the storage array controller (304) calling a function that creates a new instance of a distributed manager. As part of such a function call, the identity of a particular element in the storage system (302) may be provided to the function that creates a new instance of the distributed manager, such that the instance of the distributed manager will oversee the operation of the particular element in the storage system (302). Readers will appreciate that additional information may be provided to the function call such as, for example, an identification of the type of element that the instance of the distributed manager will oversee the operation of, an identification of particular actions that may be applied against the particular element, and so on.

The distributed manager (316) depicted in FIG. 3 may be configured to gather (318) information describing the state of the associated element in the storage system (302). The information describing the state of the associated element in the storage system (302) may be embodied as any information that describes operating parameters associated with the element. Readers will appreciate that the type of information gathered (318) by the distributed manager may vary based on the nature of the associated element in the storage system (302). For example, when the associated element is a storage device, the distributed manager (316) may be configured to gather (318) information such as the amount of space within the storage device that is currently being utilized, the amount of space within the storage device that is not currently being utilized, the amount of time since garbage collection operations were performed on the storage device, the rate at which the storage device is servicing I/O requests, and so on. Alternatively, when the associated element is a write group, the distributed manager (316) may be configured to gather (318) information such as the amount of space within the write group that is currently being utilized, the amount of space within the write group that is not currently being utilized, the amount of time required to rebuild data, the frequency at which data must be rebuilt, and so on. As such, distributed managers that are associated with different types of elements may be configured to gather (318) different types of information describing the state of the associated element.

The distributed manager (316) depicted in FIG. 3 may be further configured to determine (320) an action to perform against the associated element in the storage system (302). The distributed manager (316) may determine (320) an action to perform against the associated element in the storage system (302), for example, by applying one or more rules that utilize the information gathered (318) above as input. For example, a distributed manager (316) that is associated with a particular storage device may apply a particular rule that stipulates that data compression operations should be performed on the storage device when the utilization of the storage device reaches a predetermined threshold. Alternatively, a distributed manager (316) that is associated with a particular write group may apply a particular rule that stipulates that a system administrator should be notified that one or more storage devices in the write group may be failing when the frequency at which data is being rebuilt reaches a predetermined threshold. As such, distributed managers that are associated with different types of elements may be configured to determine (320) whether actions of different types should be performed by applying a ruleset that is specific to the particular type of element being monitored by the distributed manager.

The distributed manager (316) depicted in FIG. 3 may be further configured to execute (322) an approved action against the associated element in the storage system (302). Executing (322) an approved action against the associated element in the storage system (302) may be carried out, for example, by initiating a function call to a function that carries out a particular action. For example, if the distributed manager (316) oversees the operation of a particular storage device (324), executing (322) an approved action against the particular storage device (324) may be carried out by initiating a garbage collection routine to perform garbage collection on the particular storage device (324). In such an example, actions executed (322) against the associated element in the storage system (302) must be 'approved' in the sense that a distributed manager in the storage system (302) that has the authority to approve the execution of a particular action has communicated such an approval to the distributed manager that seeks to execute (322) the approved action, as will be described in greater detail below.

The example method depicted in FIG. 3 also includes creating (312) a distributed management hierarchy (314) that includes each of the distributed managers (316). The distributed management hierarchy (314) represents an organization of the distributed managers (316) where distributed managers are ranked one above the other. Creating (312) a distributed management hierarchy (314) that includes each of the distributed managers (316) may be carried out, for example, by applying a set of rules that rank various types of elements above each other. Such rules can stipulate, for example, that the path for a particular storage device is to be designated as a child of the particular storage device, that each storage device in a logical grouping of storage devices (e.g., a write group) is to be designated as a child of the logical grouping of storage devices, and so on. In such an example, such rules can also include information identifying whether a particular type of distributed manager (e.g., a distributed manager associated with a storage device, a distributed manager associated with a logical grouping of storage devices) is authorized to approve a child distributed manager executing a particular action, information identifying whether a particular type of distributed manager is required to seek approval prior to executing a particular action, and so on. Readers will appreciate that once the distributed management hierarchy (314) has been created (312), each distributed manager (316) may have access to information describing which other distributed managers are children of the distributed manager (316), information describing which other distributed manager is a parent of the distributed manager (316), information describing which actions that the distributed manager (316) can authorize its children to perform, information describing which actions that the distributed manager (316) cannot authorize its children to perform, information describing which actions that the distributed manager (316) can perform without authorization from its parent, information describing which actions that the distributed manager (316) can perform only with authorization from its parent, and so on.

Figure 4:
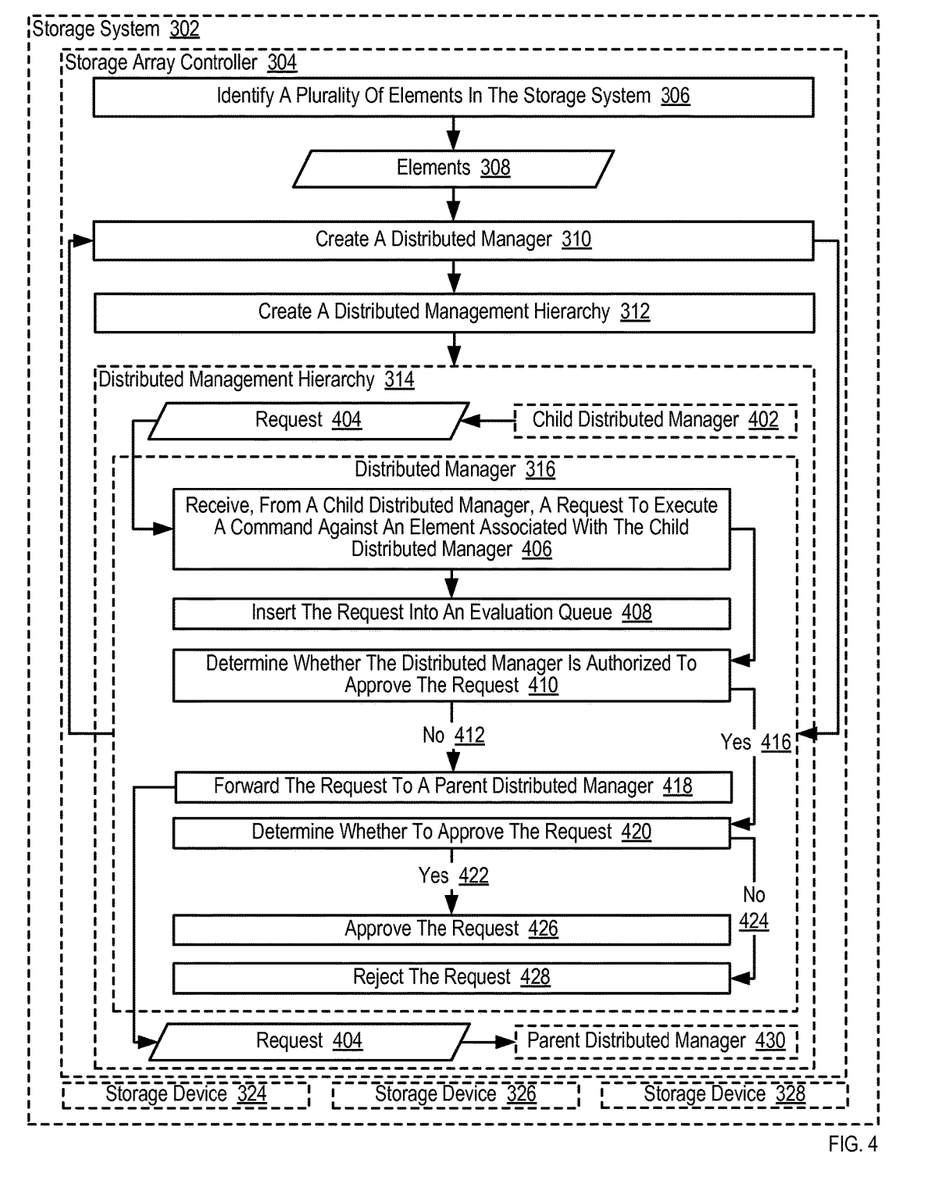
FIG. 4 sets forth a flow chart illustrating an additional example method for distributing management responsibilities for a storage system according to embodiments of the present disclosure.

For further explanation, FIG. 4 sets forth a flow chart illustrating an additional example method for distributing management responsibilities for a storage system (302) according to embodiments of the present disclosure. The example method depicted in FIG. 4 is similar to the example method depicted in FIG. 3, as the example method depicted in FIG. 4 also includes identifying (306) a plurality of elements (308) in the storage system (302), creating (310) a distributed manager (316) for each of the plurality of elements (308) in the storage system (302), and creating (312) a distributed management hierarchy (314) that includes each of the distributed managers (316). Although not expressly illustrated in FIG. 4, the distributed manager (316) depicted in FIG. 4 may also be configured for gathering information describing the state of the associated element in the storage system (302), determining an action to perform against the associated element in the storage system (302), and executing an approved action against the associated element in the storage system (302), as described above with reference to FIG. 3.

In the example method depicted in FIG. 4, each distributed manager (316) is further configured for receiving (406), from a child distributed manager (402), a request (404) to execute a command against an element associated with the child distributed manager (402). The distributed manager (316) of FIG. 4 may receive (406) a request (404) to execute a command against an element associated with the child distributed manager (402), for example, through the receipt of one or more special purpose messages sent from the child distributed manager (402) to the distributed manager (316). Alternatively, the distributed manager (316) may provide special purpose resource such as a queue to the child distributed manager (402) that the child distributed manager (402) may utilize to insert requests (404) to execute a command against an element associated with the child distributed manager (402) for review by the distributed manager (316).

In the example method depicted in FIG. 4, each distributed manager (316) is further configured for inserting (408) the request (404) into an evaluation queue. The evaluation queue may serve as a data structure for storing requests (404) to execute a command against an element associated with the child distributed manager (402). Such a data structure may be used in situations where a distributed manager that must approve the request is unavailable to process the request (404). In such an example, the evaluation queue may be populated with requests for subsequent processing and evaluation by the distributed manager that must approve the request. Readers will appreciate that although the example depicted in FIG. 4 relates to an embodiment where an evaluation queue is utilized, data structures other than queues may be utilized for storing requests (404) to execute a command against an element associated with the child distributed manager (402).

In the example method depicted in FIG. 4, each distributed manager (316) is further configured for determining (410) whether the distributed manager (316) is authorized to approve the request (404). Each distributed manager (316) may determine (410) whether the distributed manager (316) is authorized to approve the request (404), for example, by inspecting configuration parameters associated with the distributed manager (316). Such configuration parameters may be set when the distributed manager (316) is created and such configuration parameters may include, for example, information identifying the types of actions that the distributed manager (316) may authorize a child to take, information identifying the types of actions that the distributed manager (316) may not authorize a child to take, and so on. In such an example, each type of action may be associated with an identifier and a value indicating whether the distributed manager (316) may or may not authorize a child to take the associated action. Alternatively, each type of action may be associated with an identifier and each identifier may be included in a list of actions that the manager (316) may or may not authorize a child to take the associated action. Readers will appreciate that each distributed manager (316) may determine (410) whether the distributed manager (316) is authorized to approve the request (404) in many others ways according to embodiments of the present disclosure.

In the example method depicted in FIG. 4, each distributed manager (316) is further configured for forwarding (418) the request (404) to a parent distributed manager (430). The distributed manager (316) may forward (418) the request (404) to a parent distributed manager (430) in response to determining that the distributed manager is not (412) authorized to approve the request (404). The distributed manager (316) may forward (418) the request (404) to a parent distributed manager (430), for example, by sending a special purpose message to the parent distributed manager (430) that includes the request (404), by inserting the request (404) into a special purpose data structure such as a queue that is monitored by the parent distributed manager (430), and so on. In such an example, because the distributed manager (316) is not (412) authorized to approve the request (404), the distributed manager (316) effectively transmits the request (404) to a higher ranking distributed manager in the distributed management hierarchy (314).

In the example method depicted in FIG. 4, each distributed manager (316) is further configured for determining (420) whether to approve the request (404). The distributed manager (316) may determine (420) whether to approve the request (404) in response to affirmatively (416) determining that the distributed manager (316) is authorized to approve the request (404). The distributed manager (316) may determine (420) whether to approve the request (404), for example, by applying one or more that establish the conditions under which a particular action can be performed. Such rules may identify particular types of elements against which a particular action can be applied, operating conditions (e.g., during periods of low CPU utilization) under which a particular action is permitted or prohibited, or any other policy that may be enforced through the application of such rules.

In the example method depicted in FIG. 4, each distributed manager (316) is further configured for approving (426) the request (404). The distributed manager (316) may approve (426) the request (404) in response to affirmatively (422) determining to approve the request (404). The distributed manager (316) may approve (426) the request (404), for example, by sending a response message to a child distributed manager (402), by placing an approval message in a data structure such as a queue that is monitored by the child distributed manager (402), and so on. Readers will appreciate that in some embodiments, the distributed manager that ultimately approves (426) the request (404) may be removed from the distributed manager that initially issued the request (404) by multiple layers in the distributed management hierarchy (314). In such an example, each intervening distributed manager may be configured to receive the approval from its parent and pass the approval to its appropriate child.

Consider an example in which a hierarchy exists where each storage device (324, 326, 328) has an associated distributed manager (316) that has been created (310) and ultimately inserted in the distributed management hierarchy (314). Further assume that each storage device (324, 326, 328) is part of a write group, and that an associated distributed manager (316) has been created (310) for the write group, where the hierarchy (314) is structured such that each the distributed manager associated with each storage device (324, 326, 328) is a child of the distributed manager associated with the write group. Further assume that the storage system includes many write groups, each of which is a child of a system administration module executing on the storage array controller (304), and that the distributed manager associated with each write group is a child of the distributed manager associated with the system administration module executing on the storage array controller (304).

In such an example, if the distributed manager that is associated with a particular storage device (324) issues a request (404) to perform an action that must be approved by the distributed manager associated with the system administration module, the request may initially be sent to the distributed manager associated with the write group and subsequently sent to the distributed manager associated with the system administration module. Upon determining whether to approve the requested action, the distributed manager associated with the system administration module may send a response to the distributed manager associated with the write group, and the distributed manager associated with the write group may subsequently send the response to the distributed manager that is associated with the particular storage device (324).

Readers will appreciate that not all requests must ascend the entire hierarchy in order to be approved, as some requests may be approved by lower-level distributed managers. For example, a request to perform a data collection action (e.g., a read command) to be executed on one path at a time so the underlying storage device doesn't get overloaded may not need to ascend the entire hierarchy in order to be approved, as such a request may be approved by a lower-level distributed manager.

In the example method depicted in FIG. 4, each distributed manager (316) is further configured for rejecting (428)

the request (404). The distributed manager (316) may reject (428) the request (404) in response to determining not (424) to approve the request (404). The distributed manager (316) may reject (428) the request (404), for example, by sending a response message to a child distributed manager (402), by placing a rejection message in a data structure such as a queue that is monitored by the child distributed manager (402), and so on. Readers will appreciate that in some embodiments, the distributed manager that ultimately rejects (428) the request (404) may be removed from the distributed manager that initially issued the request (404) by multiple layers in the distributed management hierarchy (314). In such an example, each intervening distributed manager may be configured to receive the rejection from its parent and pass the rejection to its appropriate child.

Figure 5:
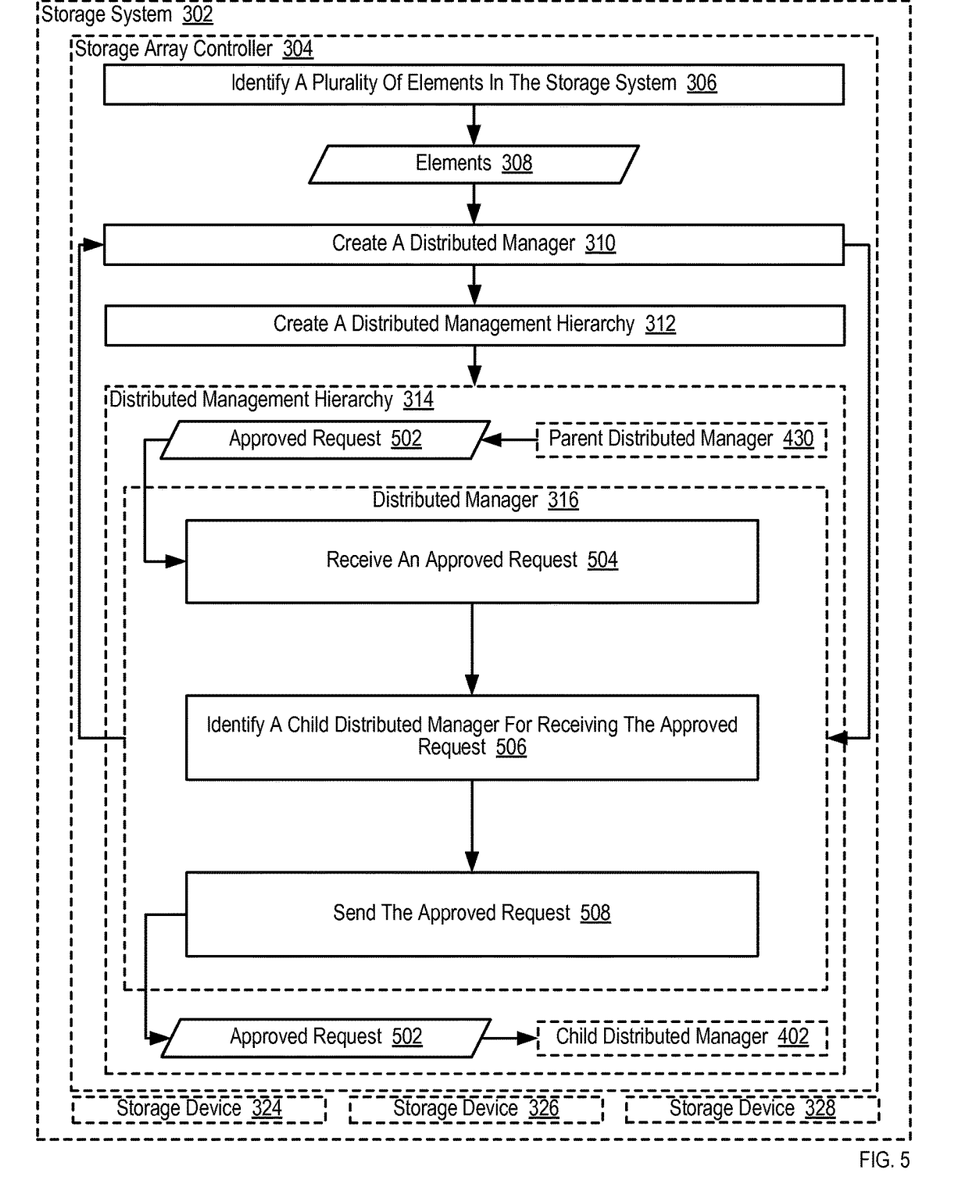
FIG. 5 sets forth a flow chart illustrating an additional example method for distributing management responsibilities for a storage system according to embodiments of the present disclosure.

For further explanation, FIG. 5 sets forth a flow chart illustrating an additional example method for distributing management responsibilities for a storage system (302) according to embodiments of the present disclosure. The example method depicted in FIG. 5 is similar to the example method depicted in FIG. 3, as the example method depicted in FIG. 5 also includes identifying (306) a plurality of elements (308) in the storage system (302), creating (310) a distributed manager (316) for each of the plurality of elements (308) in the storage system (302), and creating (312) a distributed management hierarchy (314) that includes each of the distributed managers (316). Although not expressly illustrated in FIG. 4, the distributed manager (316) depicted in FIG. 5 may also be configured for gathering information describing the state of the associated element in the storage system (302), determining an action to perform against the associated element in the storage system (302), and executing an approved action against the associated element in the storage system (302), as described above with reference to FIG. 3.

In the example method depicted in FIG. 5, each distributed manager (316) is further configured for receiving (504) an approved request (502). The approved request (502) may be received, for example, via one or more messages received from the parent distributed manager (430), via a queue or other data structure that the distributed manager (316) monitors for approved requests (502), and so on. In such an example, the approved request (502) may be received (504) from a parent distributed manager (430) although, as described above, the parent distributed manager (430) may not have only received the approved request (502) from a distributed manager that ranks higher in the distributed management hierarchy (314).

In the example method depicted in FIG. 5, each distributed manager (316) is further configured for identifying (506) a child distributed manager (402) for receiving the approved request (502). The distributed manager (316) may identify (506) the child distributed manager (402) for receiving the approved request (502), for example, by inspecting the approved request (502) for information identifying the ultimate intended recipient of the approved request (502). The information identifying the ultimate intended recipient of the approved request (502) may be embodied, for example, as a unique identifier of the distributed manager that is to receive the approved request, as a node identifier of a node within the distributed management hierarchy (314) that is to receive the approved request (502), and so on. In such an example, each distributed manager (316) may have access to information describing the arrangement of distributed managers within the distributed management hierarchy (314), such that the distributed manager (316) can identify a path for sending the approved request (502) to the intended recipient.

In the example method depicted in FIG. 5, each distributed manager (316) is further configured for sending (508), to the child distributed manager (402), the approved request (502). The distributed manager (316) may send (508) the approved request (502) to the child distributed manager (402), for example, by sending one or more messages to the child distributed manager (402), by inserting the approved request (502) into a queue or other data structure monitored by the child distributed manager (402), and so on.

Readers will appreciate that although the examples described above with respect to FIGS. 1-5 describe embodiments where one controller is designated as the primary controller and another controller is designated as a secondary controller, other embodiments are well within the scope of the present disclosure. For example, embodiments of the present disclosure can include systems in which a single controller is designated as the primary controller with respect to one function and also designated as the secondary controller with respect to another function. In such an embodiment, a primary controller is embodied as any component that has exclusive permission to perform a particular action, while all other controllers that are not permitted to perform the particular action as designated as secondary controllers. In such an example, controllers are designated as primary or secondary with respect to only one or more actions rather than designated as primary or secondary with respect to all actions.

Example embodiments of the present disclosure are described largely in the context of a fully functional computer system for distributing management responsibilities for a storage system that includes a storage array controller and a plurality of storage devices. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Although the examples described above depict embodiments where various actions are described as occurring within a certain order, no particular ordering of the steps is required. In fact, it will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of load balancing of command processing in a storage system, the storage system including one or more storage devices and one or more storage array controllers, the method comprising:

for each of a plurality of components in the storage system, creating a management module, wherein each management module is configured to:
receive, from another module, a request to execute a command against a component associated with the other module;
determine, based on configuration parameters associated with the management module, whether the management module is authorized to approve the request; and
responsive to determining that the management module is authorized to approve the request, determine whether to approve the request.

2. The method of claim 1 wherein each management module is further configured to:
responsive to determining that the management module is not authorized to approve the request, forward the request to a parent management module.

3. The method of claim 1 wherein each management module is further configured to reject the request.

4. The method of claim 1 wherein each management module is further configured to:
receive an approved request;
identify a child management module for receiving the approved request; and
send, to the child management module, the approved request.

5. An apparatus for load balancing of command processing in a storage system that includes a plurality of storage devices and one or more storage array controllers, the apparatus comprising a computer processor and a computer memory operatively coupled to the computer processor, the computer memory having disposed within it computer program instructions that, when executed by the computer processor, cause the apparatus to carry out the steps of:

for each of a plurality of components in the storage system, creating a management module, wherein each management module is configured to:
receive, from another module, a request to execute a command against a component associated with the other module;
determine, based on configuration parameters associated with the management module, whether the management module is authorized to approve the request; and
responsive to determining that the management module is authorized to approve the request, determine whether to approve the request.

6. The apparatus of claim 5 wherein each management module is further configured to:
responsive to determining that the management module is not authorized to approve the request, forward the request to a parent management module.

7. The apparatus of claim 5 wherein each management module is further configured to reject the request.

8. The apparatus of claim 5 wherein each management module is further configured to:
receive an approved request;
identify a child management module for receiving the approved request; and
send, to the child management module, the approved request.

9. A computer program product for load balancing of command processing in a storage system that includes a plurality of storage devices and one or more storage array controllers, the computer program product including a non-transitory computer readable medium comprising computer program instructions that, when executed, cause a computer to carry out the steps of:

for each of a plurality of components in the storage system, creating a management module, wherein each management module is configured to:
receive, from another module, a request to execute a command against a component associated with the other module;
determine, based on configuration parameters associated with the management module, whether the management module is authorized to approve the request; and
responsive to determining that the management module is authorized to approve the request, determine whether to approve the request.

10. The computer program product of claim 9 wherein each management module is further configured to:
responsive to determining that the management module is not authorized to approve the request, forward the request to a parent management module.

11. The computer program product of claim 9 wherein each management module is further configured to reject the request.

* * * * *